(12) United States Patent
Tsujiko

(10) Patent No.: US 11,646,456 B2
(45) Date of Patent: May 9, 2023

(54) BATTERY SYSTEM AND METHOD FOR CONTROLLING LITHIUM ION BATTERY

(71) Applicant: TOYOTA JIDOSHA KABUSHIKI KAISHA, Toyota (JP)

(72) Inventor: Akira Tsujiko, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 234 days.

(21) Appl. No.: 17/015,195

(22) Filed: Sep. 9, 2020

(65) Prior Publication Data
US 2021/0203013 A1 Jul. 1, 2021

(30) Foreign Application Priority Data
Dec. 25, 2019 (JP) .............................. JP2019-234473

(51) Int. Cl.
| | |
|---|---|
| *H01M 10/42* | (2006.01) |
| *H01M 4/525* | (2010.01) |
| *H01M 4/505* | (2010.01) |
| *H01M 4/02* | (2006.01) |

(52) U.S. Cl.
CPC ....... *H01M 10/4257* (2013.01); *H01M 4/505* (2013.01); *H01M 4/525* (2013.01); *H01M 2004/028* (2013.01); *H01M 2010/4271* (2013.01); *H01M 2220/20* (2013.01)

(58) Field of Classification Search
CPC ...... H01M 4/485; H01M 4/505; H01M 4/525; H01M 10/0525; H01M 10/42; H01M 10/4257; H01M 10/44; H01M 10/48; H01M 2004/028; H01M 2010/4271; H01M 2220/20; H02J 7/007182
See application file for complete search history.

(56) References Cited

U.S. PATENT DOCUMENTS

| | | | |
|---|---|---|---|
| 2014/0225571 A1 | 8/2014 | Obata et al. | |
| 2016/0248115 A1* | 8/2016 | Hatta | ................ H01M 10/0585 |
| 2018/0086330 A1* | 3/2018 | Ito | ........................... B60L 58/18 |

FOREIGN PATENT DOCUMENTS

| | | |
|---|---|---|
| JP | 2010251025 A | 11/2010 |
| JP | 2014154399 A | 8/2014 |
| JP | 2015131573 A | 7/2015 |
| WO | 2013046263 A1 | 4/2013 |

* cited by examiner

*Primary Examiner* — Scott J. Chmielecki
(74) *Attorney, Agent, or Firm* — Dickinson Wright, PLLC

(57) ABSTRACT

A battery system includes a battery that is a lithium ion battery including an electrode assembly containing a positive electrode active material. An ECU calculates a deterioration index value ΣD corresponding a degree of progress of high rate deterioration, and when the deterioration index value ΣD exceeds a threshold value, controls a power converter or a PCU to cause a voltage of the battery to fall within a voltage range including a specific voltage. The specific voltage is a peak voltage on a dQ/dV voltage characteristic curve, the peak voltage being derived from structural change of the positive electrode active material. The dQ/dV voltage characteristic curve is a curve indicating a relationship between dQ/dV that is a ratio of a change dQ of a stored electricity amount to a change dV of the voltage of the battery, and the voltage of the battery.

5 Claims, 10 Drawing Sheets

<FIRST PATTERN>

<SECOND PATTERN>

<THIRD PATTERN>

<FIRST PATTERN/NCA>

BATTERY SYSTEM AND METHOD FOR CONTROLLING LITHIUM ION BATTERY

CROSS-REFERENCE TO RELATED APPLICATION

This application claims priority to Japanese Patent Application No. 2019-234473 filed on Dec. 25, 2019, incorporated herein by reference in its entirety.

BACKGROUND

1. Technical Field

The present disclosure relates to a battery system and a method for controlling a lithium ion battery, and more particularly, it relates to a technique for suppressing high rate deterioration of a lithium ion battery.

2. Description of Related Art

In recent years, vehicles including a lithium ion battery as a driving battery have been widely spread. It is known that a lithium ion battery can be deteriorated in accordance with charge/discharge at a large current (high rate) of the lithium ion battery. This deterioration is also designated as the "high rate deterioration". Various techniques for suppressing the high rate deterioration of a lithium ion battery have been proposed.

For example, Japanese Patent Application Publication No. 2014-154399 discloses a control method by which the high rate deterioration of a secondary battery can be suppressed by warming the secondary battery at appropriate timing. Besides, Japanese Patent Application Publication No. 2010-251025 discloses a battery system capable of suppressing the high rate deterioration of a lithium ion battery by vibrating an electrolyte of the lithium ion battery.

SUMMARY

In general, lithium ion batteries for vehicles and the like are expensive. Therefore, when the high rate deterioration of a lithium ion battery proceeds, it is preferable for a user to recover (or suppress) the high rate deterioration of the lithium ion battery to prevent decline in value of the lithium ion battery.

A representative battery system is provided with a voltage converter for charging/discharging a lithium ion battery. In the techniques disclosed in JP 2014-154399 A and JP 2010-251025 A, however, another device is necessary, in addition to the voltage converter, for recovering the high rate deterioration. Specifically, in JP 2014-154399 A, a heater for warming the secondary battery is necessary. In JP 2010-251025 A, a device for vibrating the electrolyte of the lithium ion battery is necessary. It is preferable to recover the high rate deterioration of a lithium ion battery with a simpler structure without using an additional device not provided in a usual battery system as in these techniques.

The present disclosure was devised to solve this problem, and an object of the present disclosure is to recover (suppress) the high rate deterioration of a lithium ion battery with a simple structure.

(1) A battery system according to one aspect of the present disclosure includes: a lithium ion battery including an electrode assembly; a voltage converter configured to be capable of changing a voltage of the lithium ion battery; and a control unit that controls the voltage converter. The control unit calculates an index value corresponding to a degree of progress of deterioration occurring in the lithium ion battery due to bias in a lithium ion concentration distribution within the electrode assembly, and controls the voltage converter to cause the voltage of the lithium ion battery to fall within a predetermined voltage range including a specific voltage when the index value exceeds a threshold value. The specific voltage is a peak voltage on a dQ/dV voltage characteristic curve, the peak voltage being derived from structural change of a positive electrode active material contained in the electrode assembly. The dQ/dV voltage characteristic curve is a curve indicating a relationship between dQ/dV that is a ratio of a change dQ of a stored electricity amount of the lithium ion battery to a change dV of the voltage of the lithium ion battery, and the voltage of the lithium ion battery.

(2) The control unit controls the voltage converter in such a manner that the lithium ion battery is repeatedly charged/discharged within the voltage range when the index value exceeds the threshold value.

(3) The control unit controls the voltage converter in such a manner that a state of the lithium ion battery at a constant voltage within the voltage range is retained for a predetermined time period when the index value exceeds the threshold value.

In the structures of (1) to (3) described above, when the deterioration index value of the lithium ion battery exceeds the threshold value, the voltage of the lithium ion battery is adjusted to fall within the voltage range including the specific voltage. Although the details are described below, a positive electrode is thus shrunk due to structural change of the positive electrode active material, and hence a negative electrode relatively expands. Owing to the expansion of the negative electrode, an electrolyte is absorbed by the negative electrode, resulting in reducing the bias in the lithium ion concentration distribution within the electrode assembly. This process is performed by using the voltage converter that is usually provided in the lithium ion battery, and hence there is no need to provide an additional device. Therefore, according to the structures of (1) to (3) described above, the high rate deterioration of a lithium ion battery can be recovered with a simple structure.

(4) The positive electrode active material contains a lithium nickel composite oxide represented by $LiNi_xM_yO_2$ and having a layer structure. M includes at least one selected from the group consisting of Co, Mn and Al. Relationships of $0.6 \leq x < 1$, $0 < y$ and $x+y=1$ are satisfied.

According to the structure of (4) described above, the shrinkage of the positive electrode due to the structural change of the positive electrode active material is increased as compared with a case where a nickel composition ratio is less than 0.6. As a result, the expansion of the negative electrode becomes conspicuous, and the effect of reducing the bias in the lithium ion concentration distribution is increased. Accordingly, the high rate deterioration of a lithium ion battery can be more definitely recovered.

(5) In a method for controlling a lithium ion battery according to another aspect of the present disclosure, a lithium ion battery including an electrode assembly is controlled. The control method includes first and second steps: The first step is a step of calculating an index value corresponding to a degree of progress of deterioration of the lithium ion battery due to bias in a lithium ion concentration distribution within the electrode assembly. The second step is a step of adjusting a voltage of the lithium ion battery to fall within a voltage range including a specific voltage when the index value exceeds a predetermined threshold value. The specific voltage is a peak voltage on a dQ/dV voltage characteristic curve, the peak voltage being derived from structural change of a positive electrode active material contained in the electrode assembly. The dQ/dV voltage characteristic curve is a curve indicating a relationship between dQ/dV that is a ratio of a change dQ of a stored electricity amount of the lithium ion battery to a change dV of the voltage of the lithium ion battery, and the voltage of the lithium ion battery.

According to the method of (5) described above, the high rate deterioration of a lithium ion battery can be recovered with a simple structure as in the structure of (1) described above.

According to the present disclosure, the high rate deterioration of a lithium ion battery can be recovered (suppressed) with a simple structure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Now, an embodiment of the present disclosure will be described in detail with reference to the accompanying drawings. It is noted that like reference signs are used to refer to like or corresponding elements to avoid redundant description.

In the following, a structure in which a battery system according to the present embodiment is installed on an electric vehicle will be described as an example. It is, however, noted that the battery system of the present embodiment is applicable not only to an electric vehicle but also to the whole vehicles in which a lithium ion battery is installed (such as a hybrid vehicle and a fuel cell vehicle). Besides, the application of the battery system of the present embodiment is not limited to the application to vehicles but may be stationary application.

Embodiment

Overall Structure

Figure 1:
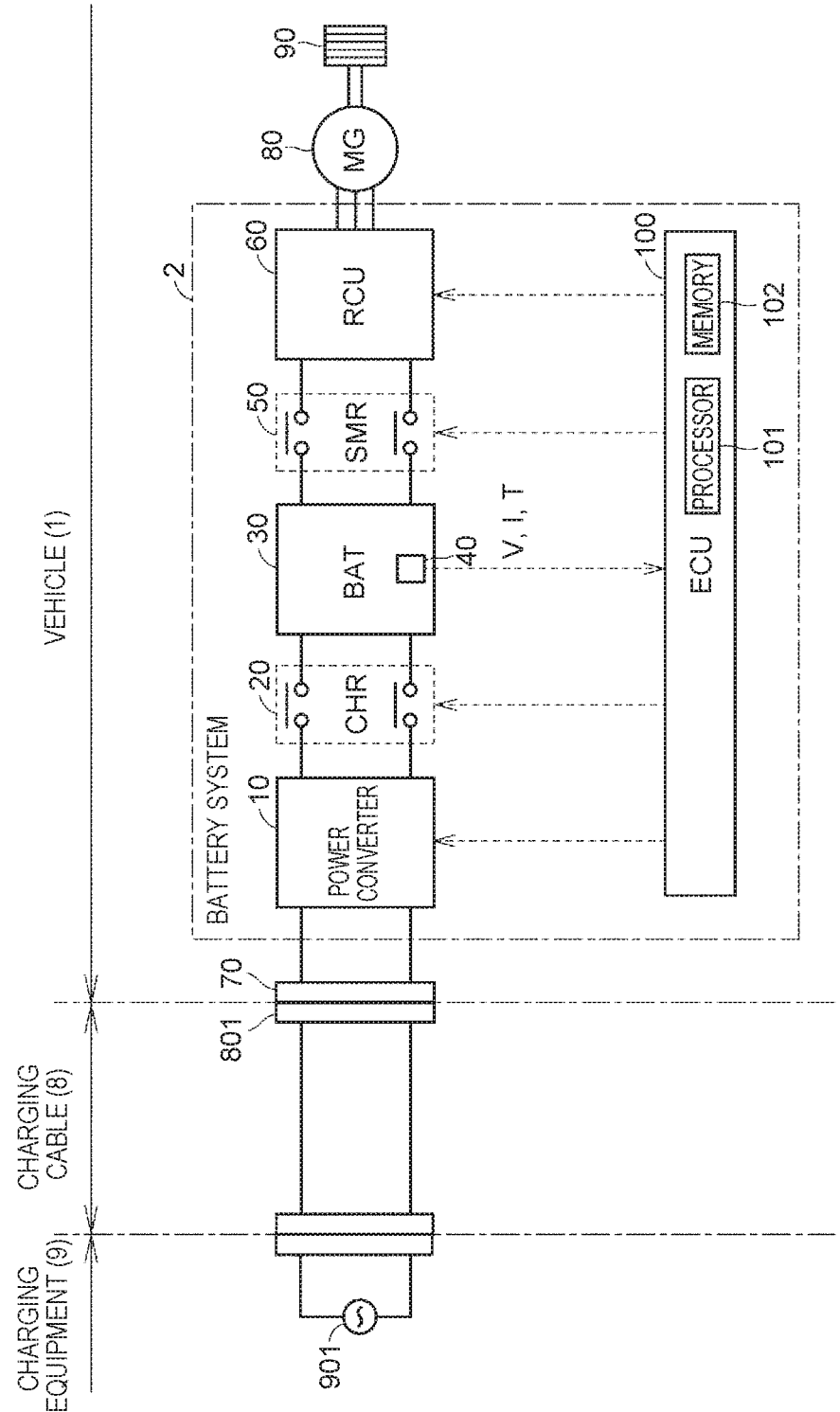
FIG. 1 is a diagram schematically illustrating an overall structure of a vehicle including a battery system according to an embodiment of the disclosure.

FIG. 1 is a diagram schematically illustrating an overall structure of a vehicle including a battery system of the present embodiment. Referring to FIG. 1, a vehicle 1 is an electric vehicle in the present embodiment. The vehicle 1 includes a battery system 2. The battery system 2 includes a power converter 10, a charge relay (CHR) 20, a battery 30, a monitoring unit 40, a system main relay (SMR) 50, a power control unit (PCU) 60, and an electronic control unit (ECU) 100. The vehicle 1 further includes, in addition to the battery system 2, an inlet 70, a motor generator (MG) 80, and a drive wheel 90.

FIG. 1 illustrates an exemplified structure in which the battery 30 installed on the vehicle 1 is charged by electric power supplied from charging equipment 9 disposed outside the vehicle 1 (as so-called external charge). In the external charge, the charging equipment 9 and the vehicle 1 are electrically connected to each other via a connector 801 of a charging cable 8 and the inlet 70.

The power converter 10 includes, for example, an AC/DC converter (not shown). The power converter 10 converts AC power supplied from the charging equipment 9 (system power supply 901) into DC power, and outputs the DC power to the charge relay 20.

The charge relay 20 is electrically connected to a power line connecting the power converter 10 and the battery 30 to each other. The charge relay 20 is opened/closed in accordance with a control signal supplied from the ECU 100.

Figure 2:
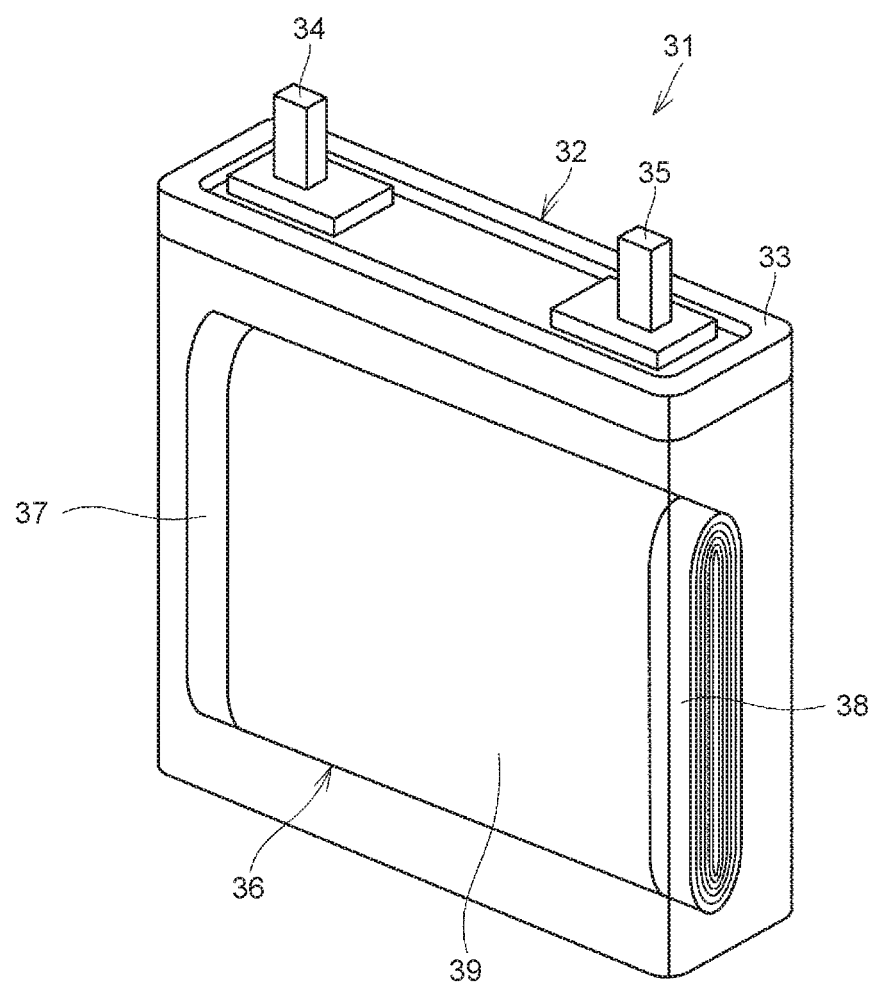
FIG. 2 is a diagram illustrating a structure of each cell in more detail.

The battery 30 is a battery pack including a plurality of cells 31 (see FIG. 2). Each cell 31 is a lithium ion battery. The internal structure of the battery 30 (connection among the plurality of cells 31) does not matter, and the battery 30 will be described as a control target in the following.

The battery 30 stores electric power for driving the motor generator 80, and supplies the electric power to the motor generator 80 via the PCU 60. Besides, the battery 30 is charged, in the external charge, by the electric power supplied via the power converter 10. Furthermore, the battery 30 is charged, also in power generation of the motor generator 80 (such as regenerative power generation), by generated power received via the PCU 60.

The monitoring unit 40 includes a voltage sensor, a current sensor, and a temperature sensor (all not shown). The voltage sensor detects a voltage V of the battery 30. The current sensor detects a current I input/output to/from the battery 30. The temperature sensor detects a temperature T of the battery 30. Each of these sensors outputs a signal corresponding to the detection result to the ECU 100.

The SMR 50 is electrically connected to a power line connecting the battery 30 and the PCU 60 to each other. The SMR 50 is opened/closed in accordance with a control signal supplied from the ECU 100.

The PCU 60 includes, for example, an inverter and a converter (both not shown). The PCU 60 executes, in accordance with a control signal supplied from the ECU 100, bidirectional power conversion between the battery 30 and the motor generator 80. It is noted that at least one of the power converter 10 and the PCU 60 corresponds to a "voltage converter" according to the present disclosure.

The motor generator 80 is, for example, a three-phase AC rotating electrical machine in which a permanent magnet is buried in a rotor (not shown). The motor generator 80 rotates a drive shaft by using the electric power supplied from the battery 30. Besides, the motor generator 80 can generate power by regenerative breaking. AC power generated by the motor generator 80 is converted into DC power by the PCU 60 to charge the battery 30.

The ECU 100 includes a processor 101 such as a CPU (central processing unit), a memory 102 such as a ROM (read only memory) or a RAM (random access memory), and input/output ports (not shown) through which various signals are input/output. The ECU 100 controls various devices to place the vehicle 1 in a desired state based on input of the signal from each sensor and a map and a program stored in the memory. For example, the ECU 100 controls the power converter 10 and/or the PCU 60 to control charge/discharge of the battery 30. Principal control executed by the ECU 100 in the present embodiment is "recovery process" for recovery (which can be expressed as cancellation or relaxation) of high rate deterioration of the battery 30. The recovery process will be described in detail later.

Cell Structure

FIG. 2 is a diagram illustrating the structure of each cell 31 in more detail. In FIG. 2, the inside of the cell 31 is perspectively illustrated.

The cell 31 includes a battery case 32 in a substantially rectangular parallelepiped shape. An upper surface of the battery case 32 is sealed by a cover 33. One end of each of a positive electrode terminal 34 and a negative electrode terminal 35 projects outward beyond the cover 33. The other ends of the positive electrode terminal 34 and the negative electrode terminal 35 are respectively connected to an internal positive electrode terminal and an internal negative electrode terminal (both not shown) within the battery case 32.

An electrode assembly 36 is housed in the battery case 32. The electrode assembly 36 is formed by stacking a positive electrode 37 and a negative electrode 38 on each other with a separator 39 disposed therebetween, and winding the thus obtained stack. An electrolyte (not shown) is held by the positive electrode 37, the negative electrode 38 and the separator 39. It is noted that the stack may be used instead of a roll as the electrode assembly 36.

For the positive electrode 37, the negative electrode 38, the separator 39 and the electrolyte, any of conventionally known structures and materials can be used. Specifically, for the positive electrode 37, a lithium nickel composite oxide having a layer structure can be used. This lithium nickel composite oxide is represented by $LiNi_xM_yO_2$. Here, M includes at least one selected from the group consisting of cobalt (Co), manganese (Mn) and aluminum (Al). The composition ratio x of nickel is preferably 0.6 or more, and more preferably 0.8 or more.

For example, polyolefin (such as polyethylene or polypropylene) can be used for the separator. The electrolyte contains an organic solvent (such as a mixed solvent of DMC (dimethyl carbonate), EMC (ethyl methyl carbonate) and EC (ethylene carbonate)), a lithium salt (such as $LiPF_6$) and an additive (such as LiBOB (lithium bis(oxalato)borate) or $Li[PF_2(C_2O_4)_2]$).

Deterioration of Battery

In the vehicle 1 having the above-described structure, various deteriorations can occur in the battery 30. When the battery 30 is charged/discharged continuously at a comparatively large current (a high rate current), "high rate deterioration", that is, a deterioration phenomenon of increase of internal resistance of the battery 30, can occur. The high rate deterioration is a deterioration caused because a lithium ion concentration distribution (salt concentration distribution) within the electrode assembly 36 is biased.

The high rate deterioration is a recoverable deterioration. In other words, when the internal resistance of the battery 30 is increased due to the high rate deterioration, the internal resistance of the battery 30 can be lowered (restored) by performing recovery process for the high rate deterioration.

An example of the other deterioration of the battery 30 except for the high rate deterioration includes deposition of lithium on the surface of the negative electrode 38 (so-called lithium deposition). When the lithium deposition occurs, the capacity of the battery 30 is lowered. If the deposited lithium can be removed from the negative electrode 38, the capacity of the battery 30 can be recovered, but this process is not realistic to perform in the battery 30 in use. In other words, the lithium deposition is an unrecoverable deterioration. Besides, also an aging deterioration can occur in the battery 30. The deterioration over time of the battery 30 is also an irreversible deterioration basically, and is unrecoverable.

In the present embodiment, a degree of progress of the high rate deterioration, which is a recoverable deterioration among the various deteriorations, is quantitatively evaluated. When the degree of progress of the high rate deterioration reaches a predetermined degree, the recovery process for recovering the high rate deterioration is executed. More specifically, the ECU 100 calculates a "deterioration index value ED" that is an index value corresponding to the degree of progress of the high rate deterioration. Now, a calculation method for the deterioration index value ED will be simply described. It is noted that International Publication No. WO2013/046263, Japanese Patent Application Publication No. 2015-131573 and the like can be referred to for the details of the calculation method for the deterioration index value ED.

Deterioration Index Value

The ECU 100 calculates an evaluation value D to be used for calculating the deterioration index value ΣD every predetermined control cycle Δt. An evaluation value of the battery 30 calculated in the Nth (current) control cycle is expressed as an evaluation value D(N), and an evaluation value calculated in the (N−1)th (previous) control cycle is expressed as an evaluation value D(N−1). Here, N is a natural number. The evaluation value D(N) is calculated, in consideration of both increase and decrease of the bias in the salt concentration distribution accompanying the charge/discharge of the battery 30, in accordance with a recurrence formula of the following expression (1). It is noted that an initial value D(0) of the evaluation value is set to, for example, zero.

$$D(N)=D(N-1)-D(-)+D(+) \quad (1)$$

In the expression (1), a decreasing amount D(−) of the evaluation value corresponds to a decreasing amount of the bias in the salt concentration distribution due to diffusion of lithium ions caused after the time of calculation of the previous evaluation value until the time of calculation of the current evaluation value (during the control cycle Δt). The decreasing amount D(−) can be calculated by using a forgetting factor α in accordance with the following expression (2). It is noted that 0<α×Δt<1.

$$D(-)=\alpha \times \Delta t \times D(N-1) \quad (2)$$

The forgetting factor α is a coefficient corresponding to a diffusion rate of lithium ions in the electrolyte, and depends on the temperature T and SOC (state of charge) of the battery 30. Therefore, the correlation of the forgetting factor α with the temperature T and the SOC is precedently obtained by prior evaluation (through an experiment or simulation) to be stored in the memory 102 of the ECU 100 in the form of a map or a conversion equation. The ECU 100 can calculate the forgetting factor α based on the temperature T and the SOC by referring to the map or the conversion equation. With respect to a current coefficient β and a critical threshold C, a map or a conversion equation can be similarly created based on results of prior evaluation.

Referring to the expression (1) again, an increasing amount D(+) of the evaluation value corresponds to an increasing amount of the bias in the salt concentration distribution due to charge/discharge performed after the time of calculation of the previous evaluation value until the time of calculation of the current evaluation value (during the control cycle Δt). The increasing amount D(+) can be calculated by using the current coefficient β, the critical threshold C and the current I in accordance with the following expression (3).

$$D(+)=(\beta/C) \times I \times \Delta t \qquad (3)$$

The ECU calculates a deterioration index value ΣD(N) by integrating the evaluation values D(N) regarding all values of N from the initial value (0) to the current value (N) in accordance with the following expression (4).

$$\Sigma D(N)=\gamma \times \Sigma D(N-1)+\eta \times D(N) \qquad (4)$$

In the expression (4), γ represents an attenuation coefficient. Since the bias in the salt concentration distribution is reduced through the diffusion of lithium ions over time, it is preferable, in calculating the current index value ΣD(N), to consider that the previous index value ΣD(N−1) has reduced. Accordingly, the attenuation coefficient γ used as the coefficient of the previous index value ΣD(N−1) is set to a value smaller than 1. η represents a correction coefficient, and is appropriately set. As the attenuation coefficient γ and the correction coefficient η, values precedently set and stored in the memory 102 are used.

In this manner, the occurrence and reduction of the bias in the salt concentration distribution are respectively expressed by using the increasing amount D(+) and the decreasing amount D(−) as described above to calculate the current deterioration index value ΣD(N), and thus, change (increase/decrease) of the bias in the salt concentration distribution corresponding to the cause of the high rate deterioration can be appropriately grasped.

In the present embodiment, for the deterioration index value ΣD(N), a value indicating that the bias in the salt concentration distribution has been increased to some extent and hence further progress of the high rate deterioration is preferably prevented (threshold value TH) is precedently set. When the deterioration index value ΣD(N) exceeds the threshold value TH, the ECU 100 executes the recovery process for recovering the high rate deterioration of the battery 30. For this recovery process, a "dQ/dV voltage characteristic curve" of the battery 30 is used.

dQ/dV Voltage Characteristic Curve

In the present embodiment, the memory 102 of the ECU 100 stores a dQ/dV voltage characteristic curve and a peak voltage Vc of the battery 30 in accordance with the structure of the cell 31. A dQ/dV voltage characteristic curve refers to a curve indicating the relationship between a ratio dQ/dV of a change dQ of a stored electricity amount Q of the battery 30 to a change dV of the voltage V of the battery 30, and the voltage V of the battery 30. A peak voltage Vc refers to a voltage value corresponding to the position of a main peak on the dQ/dV voltage characteristic curve.

Figure 3:
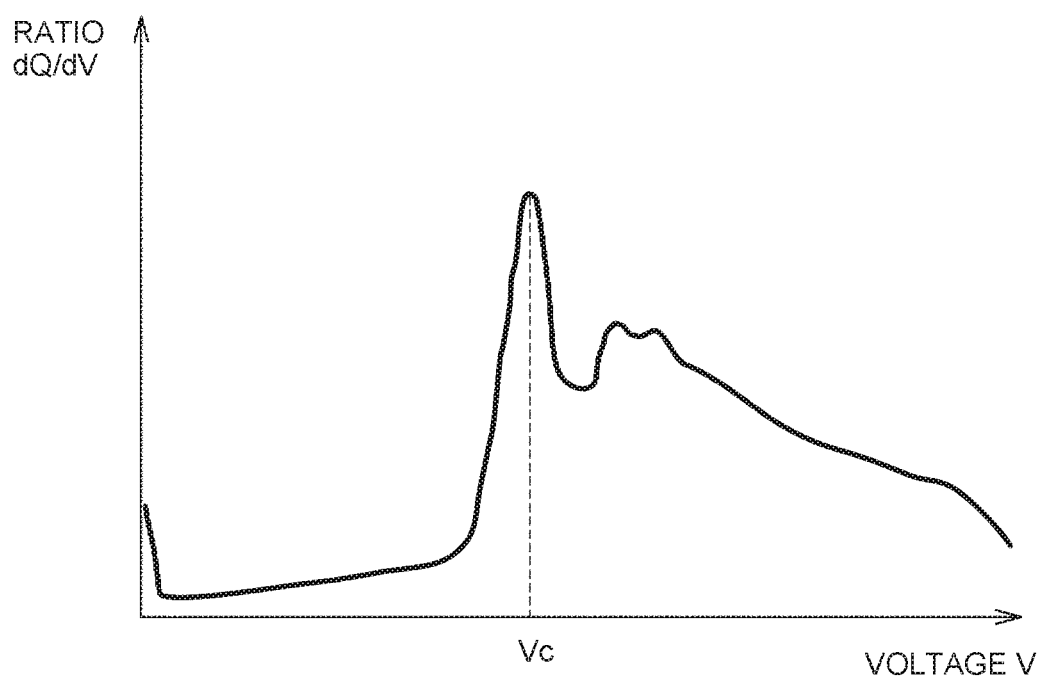
FIG. 3 is a diagram illustrating an example of a dQ/dV voltage characteristic curve.

FIG. 3 is a diagram illustrating an example of the dQ/dV voltage characteristic curve. In FIG. 3, the abscissa indicates the voltage V of the battery 30, and the ordinate indicates the ratio dQ/dV. A solid curve of FIG. 3 corresponds to the dQ/dV voltage characteristic curve. The dQ/dV voltage characteristic curve and the peak voltage Vc can be obtained, as described later, based on the current I and the voltage V of the battery 30 detected during the external charge.

Figure 4:
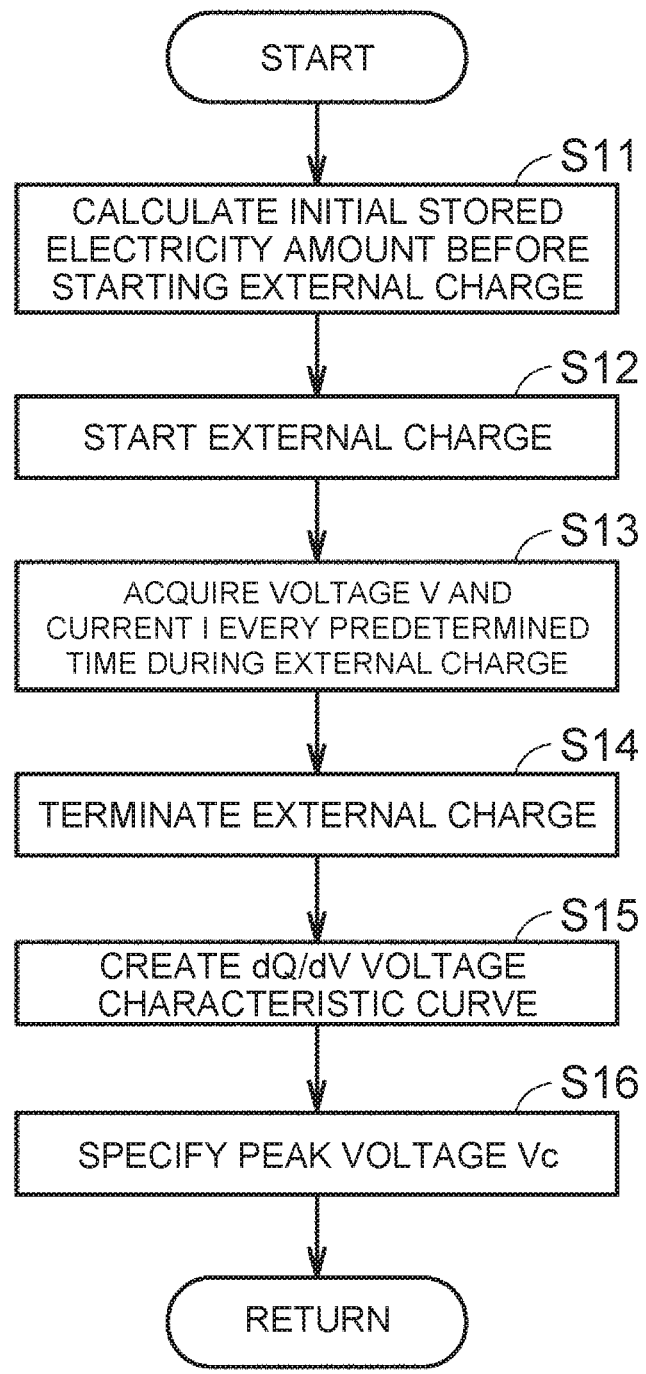
FIG. 4 is a flowchart illustrating procedures in process for calculating a dQ/dV voltage characteristic curve and a peak voltage.

FIG. 4 is a flowchart illustrating procedures in process for calculating the dQ/dV voltage characteristic curve and the peak voltage Vc. The process illustrated in this flowchart is called from a main routine, for example, when the external charge is performed in the vehicle 1 for the first time, and is executed. The execution timing of the process is, however, not limited to this. The process may be executed in the second or later external charge, or may be executed before shipping the vehicle 1. At the beginning of the process, it is assumed that preparation for the external charge has been completed with the connector 801 of the charging cable 8 inserted into the inlet 70 of the vehicle 1.

It is noted that respective steps included in the flowcharts of FIG. 4 and FIG. 6 (described later) are basically realized by software processing performed by the ECU 100, but may be realized by dedicated hardware (electric circuit) produced inside the ECU 100. Hereinafter, the term "step" is abbreviated as "S".

Referring to FIG. 4, the ECU 100 first calculates an amount of electricity stored in the battery 30 (initial stored electricity amount Q0) based on the voltage V (open circuit voltage) of the battery 30 at the beginning (immediately before beginning) of the external charge (S11). The ECU 100 stores the initial stored electricity amount Q0 in the memory 102.

In S12, the ECU 100 controls the power converter 10 to start the external charge. The battery 30 can be charged with a comparatively small current (for example, C rate=0.2 C).

During the execution of the external charge, the ECU 100 acquires, from the monitoring unit 40, the voltage V and the current I of the battery 30 at every predetermined time (S13). Specifically, the ECU 100 acquires the voltage V and the current I of the battery 30 with, for example, every second, and stores, in the memory 102, a value acquired at each timing. In this manner, time-series data corresponding to transition of the voltage V and the current I of the battery 30 during the external charge is stored in the memory 102.

When a predetermined condition for charge termination is met, the ECU 100 controls the power converter 10 to terminate the external charge (S14). In the present embodiment, it is assumed that the condition for charge termination is met when the voltage V of the battery 30 reaches a predetermined voltage (cell voltage=4.2 V). It is, however, determined that the condition for charge termination is met when the SOC of the battery 30 reaches a predetermined value (for example, SOC=100%).

Thereafter, the ECU 100 calculates the dQ/dV voltage characteristic curve of the battery 30 by using the time-series data of the voltage V and the current I acquired during the external charge (S15). In more detail, the ECU 100 calculates an electricity amount ΔQ charged to the battery 30 at each timing (timing of every predetermined time) during the execution of the external charge by integrating currents I input to the battery 30. The ECU 100 can calculate a stored electricity amount Q at each timing based on the initial stored electricity amount Q0 stored in the memory 102 before starting the external charge (S11) and the electricity amount ΔQ (current integrated value).

Besides, the ECU 100 creates information (such as a map or a relational expression) corresponding to the correspondence between the stored electricity amount Q and the voltage V of the battery 30 during the external charge by using the data of the transition of the stored electricity amount Q calculated as described above and the data corresponding to the transition of the voltage V of the battery 30. Then, the ECU 100 calculates a value of dQ/dV at every voltage V (of, for example, a voltage value at intervals of 20 mV) during the external charge by differentiating the stored electricity amount Q by the voltage V, and thus, a dQ/dV voltage characteristic curve can be created.

Subsequently, the ECU 100 specifies the position of a main peak of the thus created dQ/dV voltage characteristic curve, and defines a voltage V in this position as a peak voltage Vc (S16). Thus, a series of processing are completed. It is noted that the calculation processing of the dQ/dV voltage characteristic curve (S15) and the calculation processing of the peak voltage Vc (S16) may be performed in parallel to the data acquisition during the external charge (S13).

Structural Change of Positive Electrode Active Material

The dQ/dV voltage characteristic curve is closely related to volume change (expansion/shrinkage) of the positive electrode 37 included in the electrode assembly 36.

Figure 5:
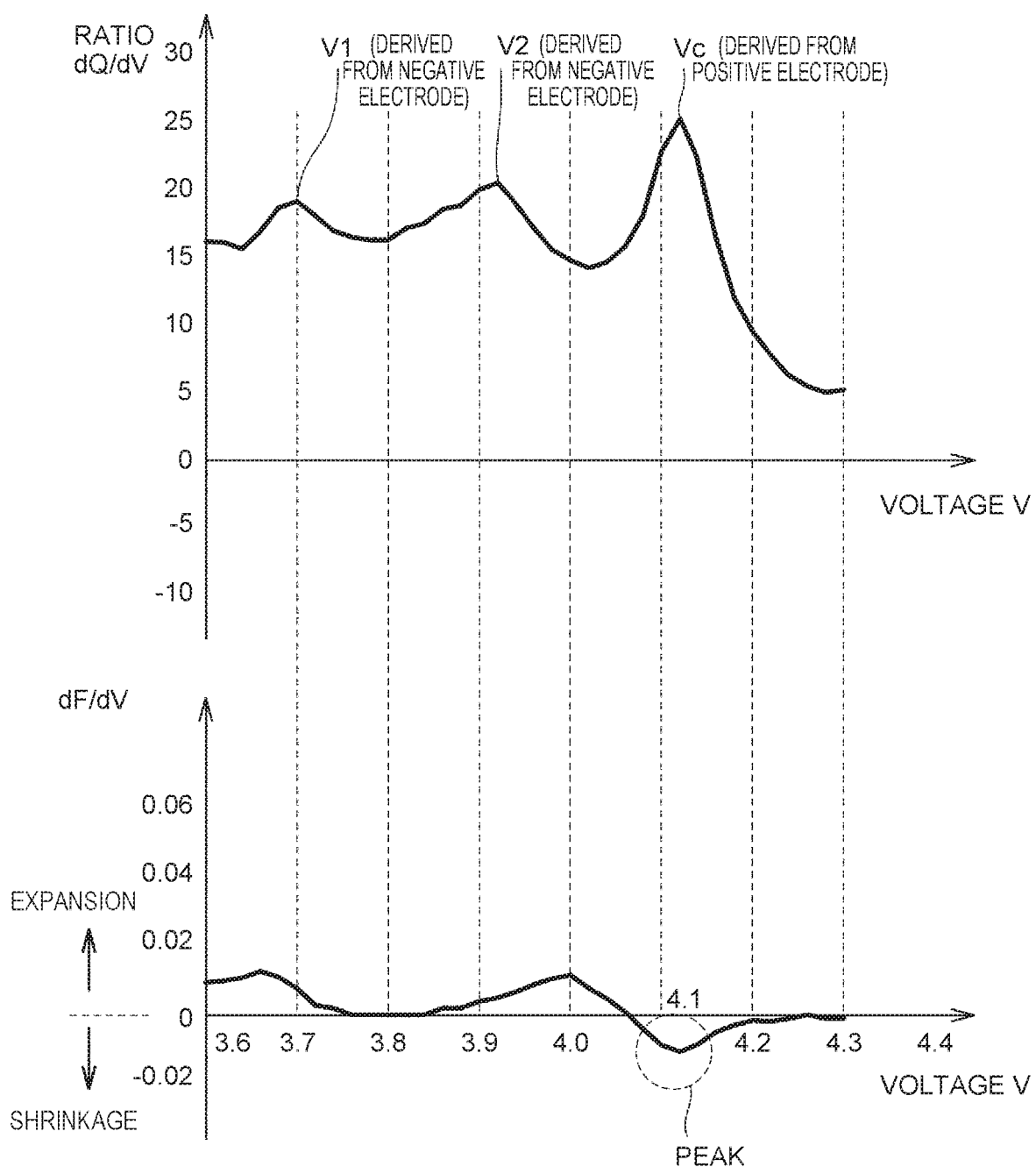
FIG. 5 is a diagram illustrating the relationship between a dQ/dV voltage characteristic curve and volume change of a positive electrode.

FIG. 5 is a diagram illustrating the volume change of the positive electrode represented by the dQ/dV voltage characteristic curve. In FIG. 5, the abscissa indicates the voltage V of the battery 30 (each cell 31). The upper ordinate indicates the ratio dQ/dV. The lower ordinate indicates dF/dV that is a ratio of a stress change dF to a change dV of the voltage V of the battery 30. In the lower ordinate, an upward direction corresponds to a direction of expansion of the positive electrode 37, and a downward direction corresponds to a direction of shrinkage of the positive electrode 37. It is noted that the stress change dF can be measured by providing a pressure sensor (surface pressure sensor) not shown on the cell 31.

In an example illustrated in FIG. 3, the peak voltage Vc is about 4.1 V (Vc≈4.1 V). On the dQ/dV voltage characteristic curve, there are peak voltages V1 and V2 respectively at about 3.7 V and about 3.9 V (V1≈3.7 V, V2≈3.9 V) in addition to the peak voltage Vc corresponding to the position of the main peak.

Attention should be paid to the correlation between the dQ/dV voltage characteristic curve and a dF/dV voltage characteristic curve at the respective peak voltages V1, V2 and Vc. A voltage in the vicinity of the peak voltage V1 corresponds to the dF/dV voltage characteristic curve being decreasing. A voltage in the vicinity of the peak voltage V2 corresponds to the dF/dV voltage characteristic curve being increasing. In other words, there is no peak in the dF/dV voltage characteristic curve in the vicinities of the peak voltages V1 and V2. It is noted that the peaks at the peak voltages V1 and V2 are derived from a negative electrode active material.

On the contrary, in the vicinity of the peak voltage Vc, the dF/dV voltage characteristic curve also has a peak. Specifically, a peak is formed because dF/dV is changed from decrease to increase as the voltage V is increased. This is probably because structural change occurs in the positive electrode active material in the vicinity of the peak voltage Vc. The positive electrode active material most largely shrinks in the vicinity of the peak voltage Vc, and the volume of the positive electrode active material thus becomes extremely small (minimum). As the voltage V gets away from the peak voltage Vc, the positive electrode active material expands.

It is noted that a peak derived from the positive electrode active material and a peak derived from the negative electrode active material can be distinguished from each other based on finding obtained from results of optical measurement of the electrodes or analysis of battery reactions through X-ray diffraction.

When the high rate deterioration is not caused in the battery 30, the electrolyte is held mainly inside the electrode assembly 36. In this state, there is not large concentration unevenness of the electrolyte. On the other hand, when the high rate deterioration progresses, the electrolyte flows out of the electrode assembly 36 through exposed regions positioned at both ends of the electrode assembly 36 (particularly, a region where the negative electrode 38 is exposed). As a result, the concentration unevenness of the electrolyte is increased.

In the recovery process, the voltage V of the battery 30 in which the high rate deterioration has progressed is changed to a voltage range including the peak voltage Vc. Thus, the positive electrode 37 is temporarily shrunk. Since the positive electrode 37 and the negative electrode 38 are in contact with each other, the negative electrode 38 expands as the positive electrode 37 shrinks. When the negative electrode 38 expands, at least a part of an excessive portion of the electrolyte flows into the electrode assembly 36 again. As a result, the concentration unevenness of the electrolyte is reduced.

In this manner, in the present embodiment, the recovery process of the battery 30 is executed when the deterioration index value ΣD of the battery 30 exceeds the threshold value TH. In the recovery process, the voltage V of the battery 30 is swung around the peak voltage Vc or retained in the vicinity of the peak voltage Vc (see, FIGS. 7 to 9) for intentionally causing the volume change of the positive electrode 37 (and the accompanying volume change of the negative electrode 38), and thus, the excessive portion of the electrolyte can be restored into the electrode assembly 36. As a result, the concentration unevenness of the electrolyte (the bias in the salt concentration distribution inside the electrode assembly 36) is reduced to some extent. Therefore, the high rate deterioration of the battery 30 can be reduced (recovered).

Recovery Process Flow

Figure 6:
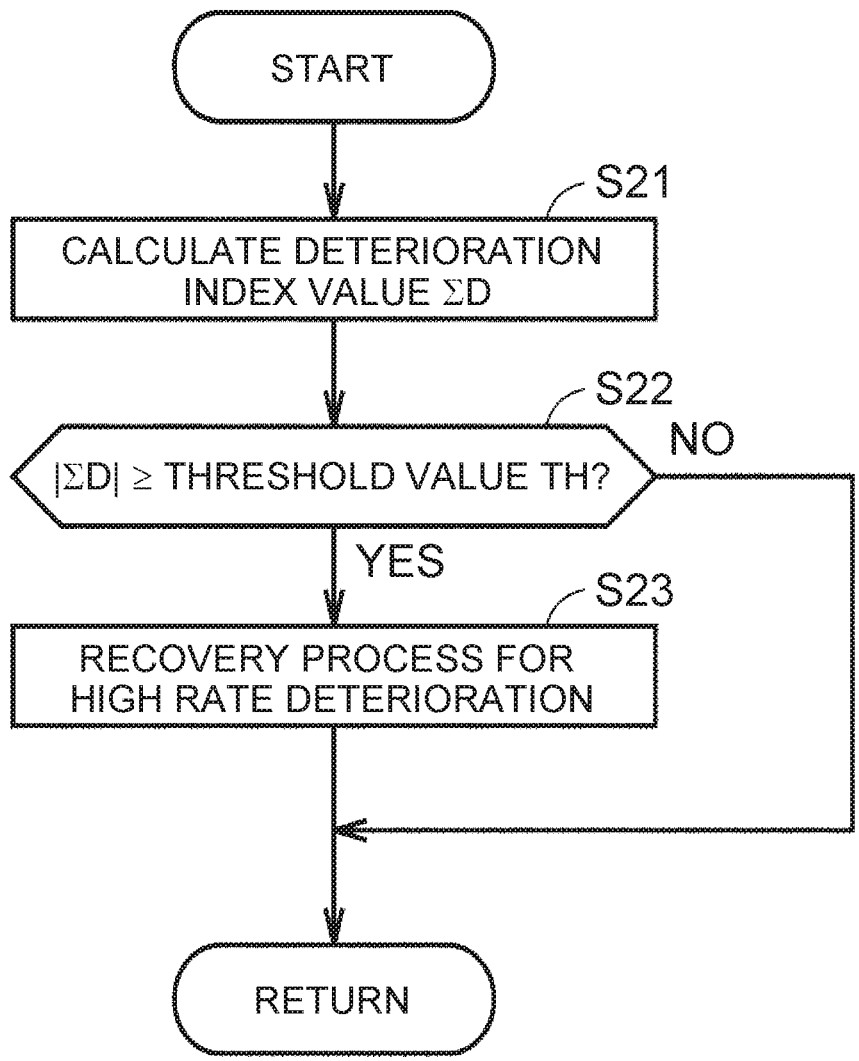
FIG. 6 is a flowchart illustrating procedures in recovery process performed in the embodiment.

FIG. 6 is a flowchart illustrating procedures in the recovery process of the present embodiment. The process illustrated in this flowchart is called from the main routine and executed every time a predetermined condition is met. This process may be executed, for example, in response to an instruction of a user, or may be executed in response to arrival of start time determined by a timer or the like.

Referring to FIG. 6, the ECU 100 calculates the deterioration index value ΣD of the battery 30 in S21. The calculation method employed here has been already described with reference to the expressions (1) to (4), and hence is not described here again.

In S22, the ECU 100 determines whether the magnitude (absolute value) of the deterioration index value ΣD of the battery 30 is equal to or larger than the predetermined threshold value TH. When the magnitude of the deterioration index value ΣD is smaller than the threshold value TH (NO in S22), the ECU 100 determines that there is no need to execute the recovery process because the high rate deterioration of the battery 30 has not largely proceeded, and returns the processing to the main routine.

When the magnitude of the deterioration index value ΣD of the battery 30 is equal to or larger than the threshold value TH (YES in S22), the ECU 100 executes the recovery process for recovering the high rate deterioration of the battery 30 (S23). In other words, the ECU 100 controls the power converter 10 and/or the PCU 60 so as to cause the voltage V of the battery 30 to fall within the voltage range including the peak voltage Vc. More specifically, in the present embodiment, the ECU 100 employs one of three patterns of the recovery process in accordance with the situation of the vehicle 1.

Figure 7:
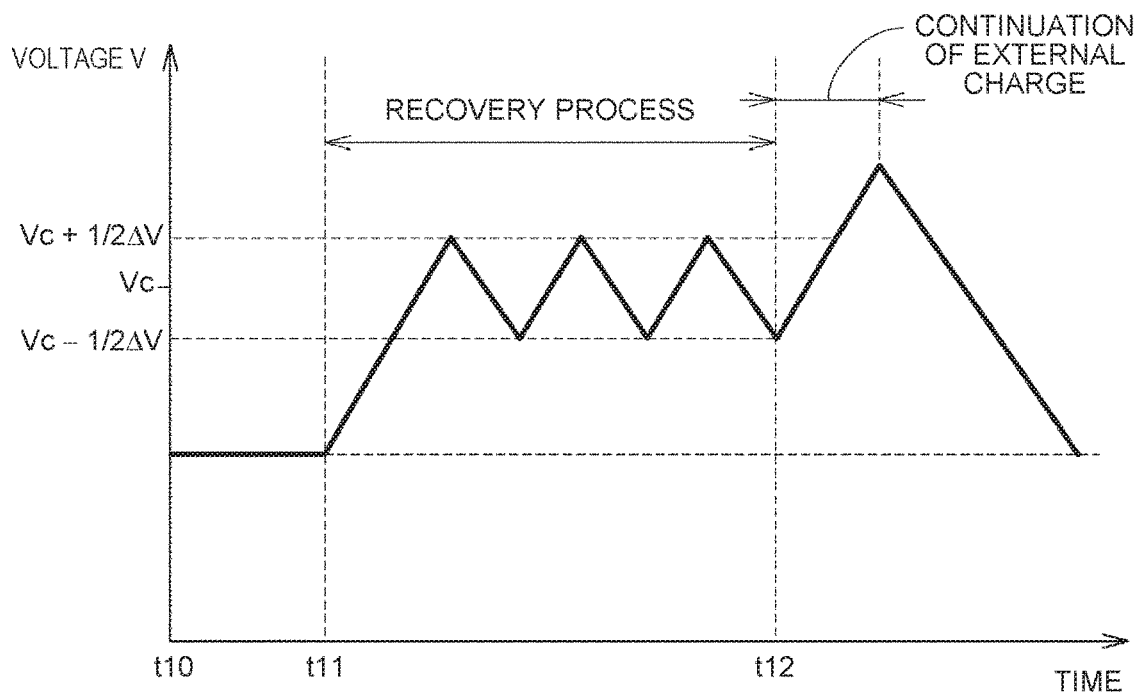
FIG. 7 is a diagram illustrating a first pattern of the recovery process.
Figure 8:
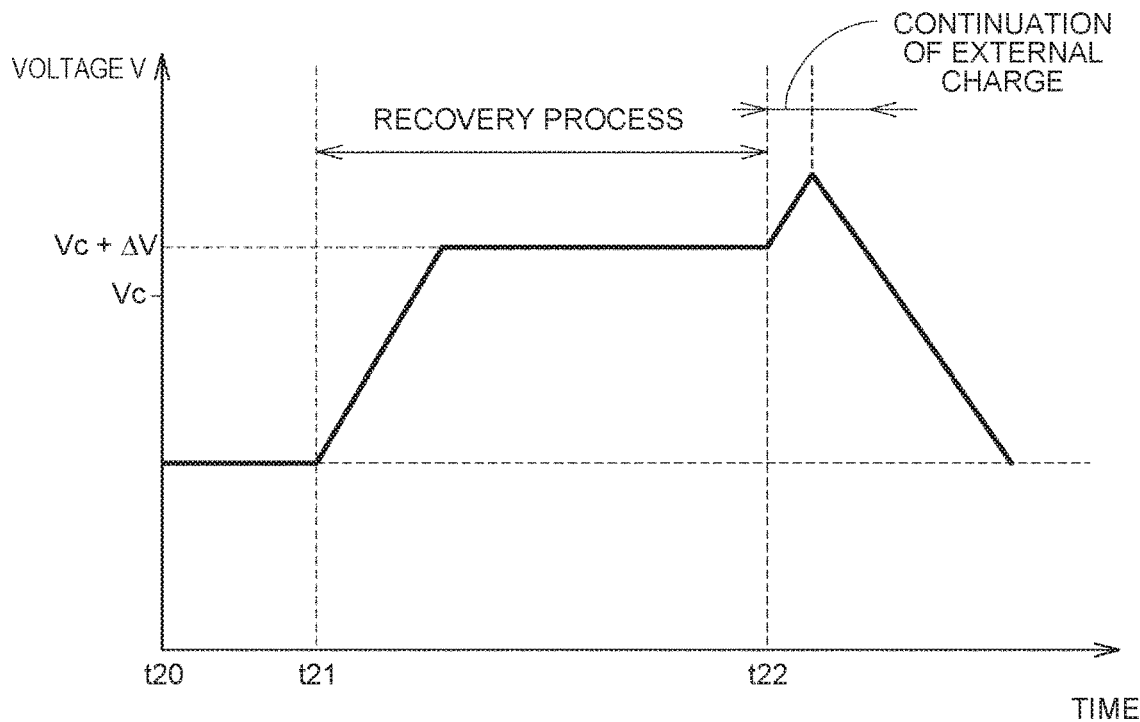
FIG. 8 is a diagram illustrating a second pattern of the recovery process.
Figure 9:
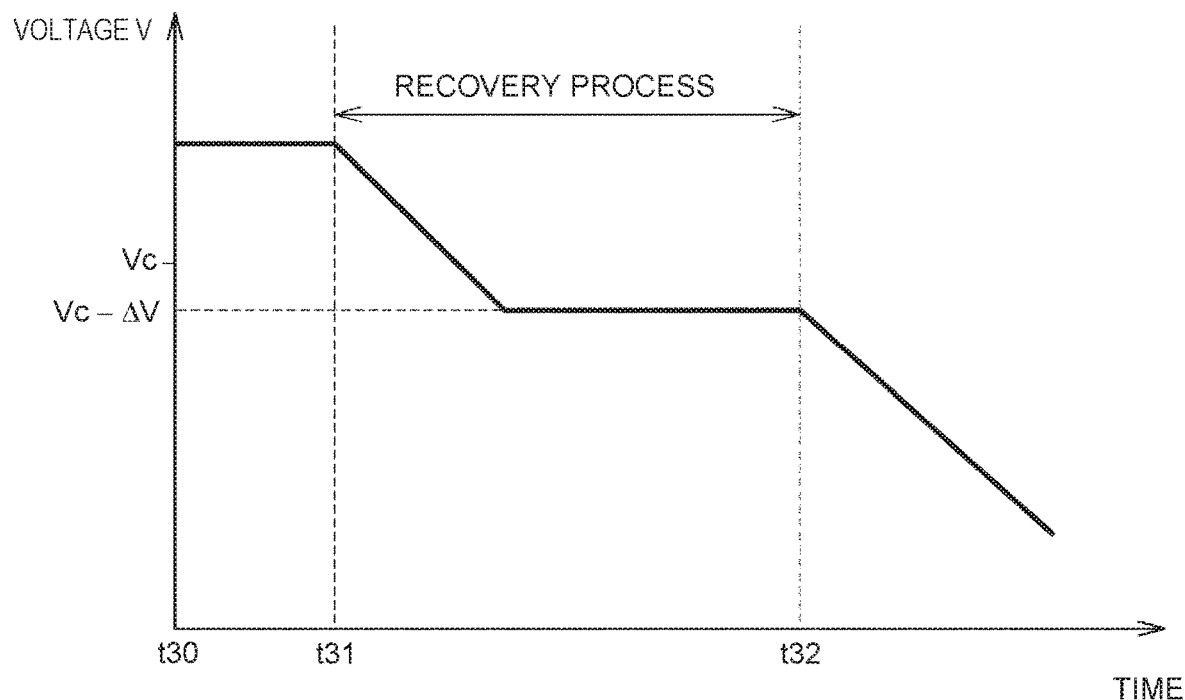
FIG. 9 is a diagram illustrating a third pattern of the recovery process.

FIG. 7 is a diagram illustrating a first pattern of the recovery process. FIG. 8 is a diagram illustrating a second pattern of the recovery process. FIG. 9 is a diagram illustrating a third pattern of the recovery process. In FIGS. 7 to 9, the abscissa indicates elapsed time, and the ordinate indicates the voltage V of the battery 30. In an example described below, the peak voltage Vc of the battery 30 is 4.1 V. Besides, a voltage difference ΔV is used for regulating the voltage range including the peak voltage, and ΔV is 0.1 V.

Referring to FIG. 7, the first pattern can be selected when the recovery process of the battery 30 is executed during the external charge of the vehicle 1. In the first pattern, the voltage V of the battery 30 at initial time t10 is significantly lower than the peak voltage Vc. Thereafter, the recovery process is started at time t11, and the battery 30 is repeatedly charged/discharged in the predetermined voltage range including the peak voltage (in a voltage range of Vc±½ΔV). The first pattern can be designated also as the "cycle pattern".

It is noted that usual external charge (continuation of the external charge) is performed at time t12 and later. In the example illustrated in FIG. 7, the battery 30 is charged/discharged three times. This is the same as a test condition of an evaluation test described later. The number of times of charging/discharging the battery 30 is, however, not especially limited, and can be appropriately determined.

Referring to FIG. 8, the second pattern can be also selected, similarly to the first pattern, when the recovery process of the battery 30 is executed during the external charge of the vehicle 1. Also in the second pattern, the voltage V of the battery 30 at initial time t20 is lower than the peak voltage Vc. The recovery process is started at time t21, and the voltage V of the battery 30 is adjusted to be in the vicinity of the peak voltage Vc (specifically, in a voltage range of Vc±ΔV). Then, the voltage V of the battery 30 is retained constant in the voltage range including the peak voltage Vc during a predetermined time period (for 30 minutes in the evaluation test described later). In the second pattern, the charge (external charge) of the battery 30 is temporarily halted during the recovery process, and hence, the second pattern can be designated also as the "charge halting pattern".

Referring to FIG. 9, the third pattern can be selected when the recovery process of the battery 30 is executed at time excluding the external charge of the vehicle 1 (for example, while the vehicle 1 is driving or parking). In the third pattern, the voltage V of the battery 30 at initial time t30 is higher than the peak voltage Vc. The recovery process is started at time t31, and the voltage V of the battery 30 is adjusted to be in the vicinity of the peak voltage Vc (in a voltage range of Vc±ΔV). Then, the voltage V of the battery 30 is retained constant within the voltage range including the peak voltage Vc during a predetermined time period (for 30 minutes in the evaluation test). Since the discharge of the battery 30 is temporarily halted during the recovery process, the third pattern can be designated also as the "discharge halting pattern".

It is noted that FIG. 8 illustrates an exemplified case where the voltage V of the battery 30 is retained at a voltage higher than the peak voltage Vc by a voltage ΔV (a voltage Vc+ΔV). Besides, FIG. 9 illustrates an exemplified case where the voltage V of the battery 30 is retained at a voltage lower than the peak voltage Vc by the voltage ΔV (a voltage Vc−ΔV). In both the second and third patterns, however, the voltage V of the battery 30 may be retained within the voltage range of Vc±ΔV. In other words, for example, the voltage V may be lower than the peak voltage Vc by the voltage ΔV in the second pattern, and the voltage V may be higher than the peak voltage Vc by the voltage ΔV in the third pattern. Furthermore, the patterns of the recovery process are not limited to these three patterns, and the characteristics of the first to third patterns may be appropriately combined as far as the voltage V is in the vicinity of the peak voltage Vc.

Evaluation Tests

The present inventor performed an evaluation test for checking the effect of the recovery process for preventing increase of the internal resistance. First, the structure of each cell 31 used in the evaluation test will be described in detail.

In one example, nickel-cobalt-aluminum (NCA: $LiNi_xCo_yAl_zO_2$) was used as the positive electrode active material. Here, x+y+z=1, and x=0.88. In another example, nickel-cobalt-manganese (NCM: $LiNi_xCo_yMn_zO_2$) was used. Here, x+y+z=1, and x=0.85. The positive electrode active material, acetylene black and polyvinylidene fluoride (PVdF) were mixed in a ratio of 87:10:3 to prepare a slurry. The slurry was applied onto both surfaces of an aluminum foil to produce a positive electrode 37 having an electrode coated on both the surfaces.

A commercially available artificial graphite was used as the negative electrode active material. A styrene-butadiene copolymer (SBR: styrene-butadiene rubber) was used as a binder. Carboxymethyl cellulose (CMC) was used as a thickener. The negative electrode active material, SBR and CMC were mixed in a ratio of 96:2:2 to prepare a slurry containing water as a dispersion medium. The slurry was applied onto both surfaces of a copper foil to produce a negative electrode 38 having an electrode coated on both the surfaces.

Seven positive electrodes 37 and eight negative electrodes 38 each produced as described above were stacked on one another with a separator 39 disposed therebetween, and thus, an electrode assembly 36 was formed. To the electrode assembly 36, terminals (an internal positive electrode terminal and an internal negative electrode terminal) were electrically connected. The resultant electrode assembly 36 was sealed in a laminate bag having three sides thermally welded, and an electrolyte was injected into the laminate bag. As a solvent of the electrolyte, ethylene carbonate (EC), dimethyl carbonate (DMC) and ethyl methyl carbonate (EMC) were used. The composition of the solvent was EC/DMC/EMC=3/4/3 (vol %). As a lithium salt, lithium hexafluorophosphate ($LiPF_6$) was used. The concentration of $LiPF_6$ was adjusted to 1.1 M in the solvent. After injecting the electrolyte, the remaining one side of the laminate bag was thermally welded for sealing. A cell 31 thus obtained was disposed between metal plates to apply a predetermined surface pressure to the cell 31.

Subsequently, results of four types of evaluation tests (first to fourth evaluation tests) will be described. A test for comparing the effect of the recovery process of the present embodiment (as a comparative example) was also performed. In this comparative example, 200 charge/discharge cycles were performed as follows: With a C-rate in charge cycle was set to 2 C, and after the voltage V reached 4.2 V, the charge was halted for 5 seconds. A C-rate in a subsequent discharge cycle was set to 1 C, and the discharge was performed until the voltage V reached 2.5 V. An internal resistance (initial resistance) of the cell was calculated based on the voltage V and the current I obtained during 0.1 seconds after starting the initial discharge. After the 200 charge/discharge cycles, the internal resistance of the cell (the internal resistance after the high rate deterioration) was calculated based on the voltage V and the current I obtained during 0.1 seconds after starting the discharge. Then, the internal resistance after the high rate deterioration against the initial resistance was calculated as an increase rate of the internal resistance (resistance increase rate). As a result, the resistance increase rate of the comparative example was 1.5.

In the first to third evaluation tests, NCA was used as the positive electrode active material. The nickel composition ratio x was 0.88 as described above. The peak voltage Vc was 4.1 V. On the other hand, in the fourth evaluation test, NCM was used as the positive electrode active material. The nickel composition ratio x was 0.85. The peak voltage Vc was 4.2 V. In order to adjust the conditions to be equivalent to that of the comparative example, 200 charge/discharge cycles were performed in the same manner as in the comparative example after executing the recovery process in all the first to fourth evaluation tests.

Figure 10:
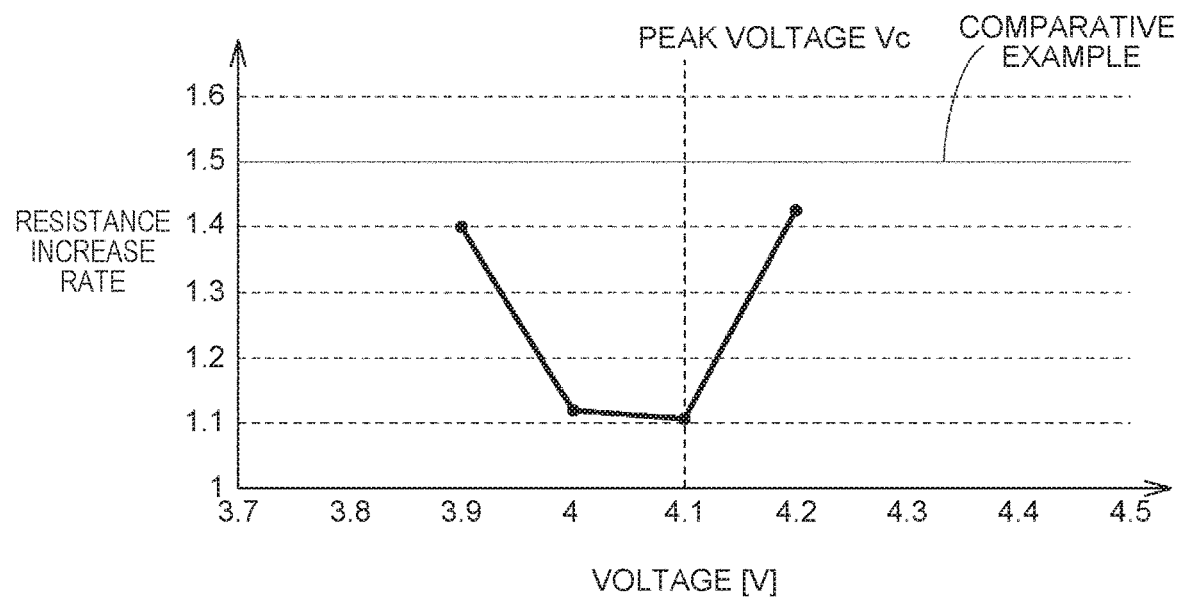
FIG. 10 is a diagram illustrating results of a first evaluation test employing the first pattern.

FIG. 10 is a diagram illustrating results of the first evaluation test employing the first pattern (cycle pattern). In FIG. 10, the abscissa indicates a voltage range of the charge/discharge cycles. The ordinate indicates the resistance increase rate of the cell 31. In more detail, as the resistance increase rate corresponding to 3.9 V on the abscissa, a measurement result obtained when the charge/discharge cycles of the recovery process (of the first pattern) were performed three times in a voltage range of 3.9 V to 4.0 V is shown. As the resistance increase rate corresponding to 4.0 V on the abscissa, a measurement result obtained when the charge/discharge cycles of the recovery process were performed three times in a voltage range of 4.0 V to 4.1 V is shown. The same applies to the other values (4.1 V and 4.2 V) on the abscissa.

It is understood, from the measurement results illustrated in FIG. 10, that the resistance increase rate of the cell 31 is suppressed to be low when the voltage range of the recovery process is set to the voltage range of 4.0 V to 4.1 V, or when the voltage range of the recovery process is set to the voltage range of 4.1 V to 4.2 V as compared with when the recovery process is performed in the other voltage ranges or in the comparative example. In this manner, it is understood that the increase of the internal resistance of the battery 30 can be suppressed through charge/discharge cycles performed in the voltage range including the peak voltage Vc of 4.1 V.

Figure 11:
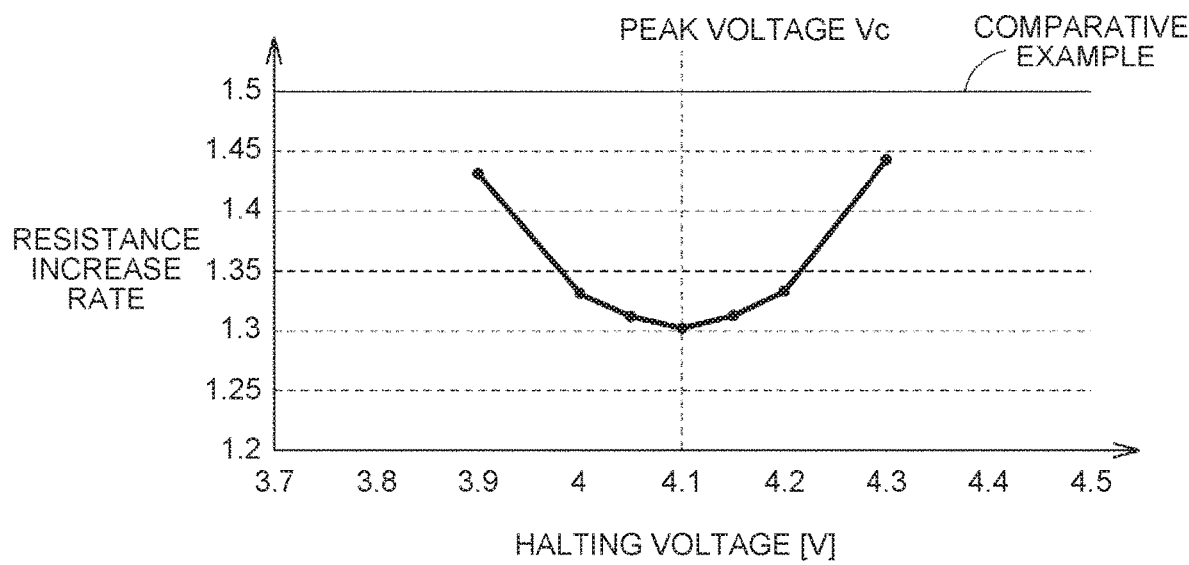
FIG. 11 is a diagram illustrating results of a second valuation test employing the second pattern.

FIG. 11 is a diagram illustrating results of the second evaluation test employing the second pattern (charge halting pattern). In FIG. 11, the abscissa indicates a voltage halted during the charge (halting voltage), and the ordinate indicates the resistance increase rate.

Referring to FIG. 11, also in the recovery process of the charge halting pattern, the charge of the cell 31 was halted at the peak voltage Vc (=4.1 V), and this state was continued for a predetermined time period (for 30 minutes in this example). Thus, as compared with a case where the halting voltage is set to a voltage different from the peak voltage Vc (or the comparative example), the increase of the internal resistance of the cell 31 can be made small.

Figure 12:
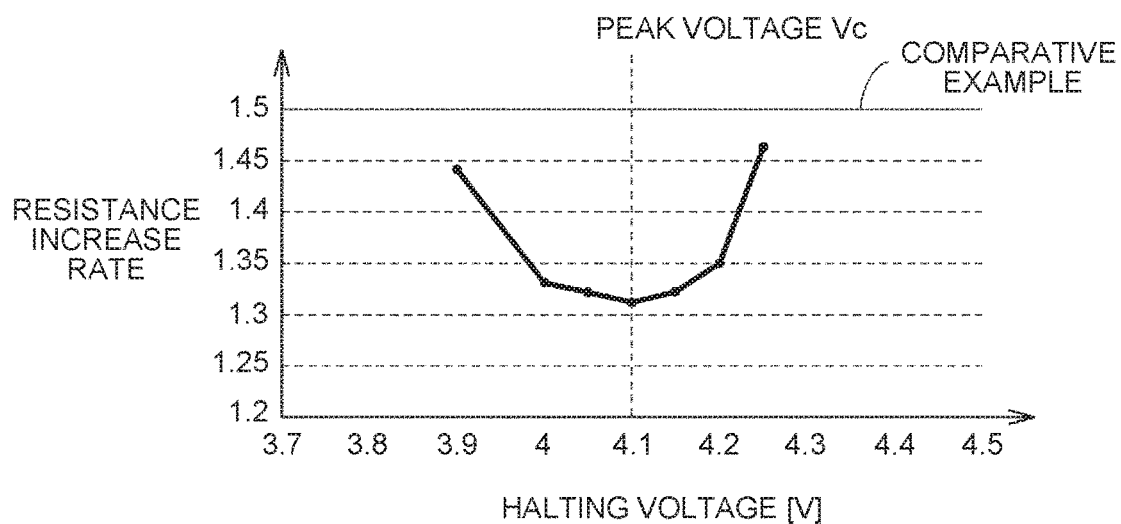
FIG. 12 is a diagram illustrating results of a third evaluation test employing the third pattern.
Figure 13:
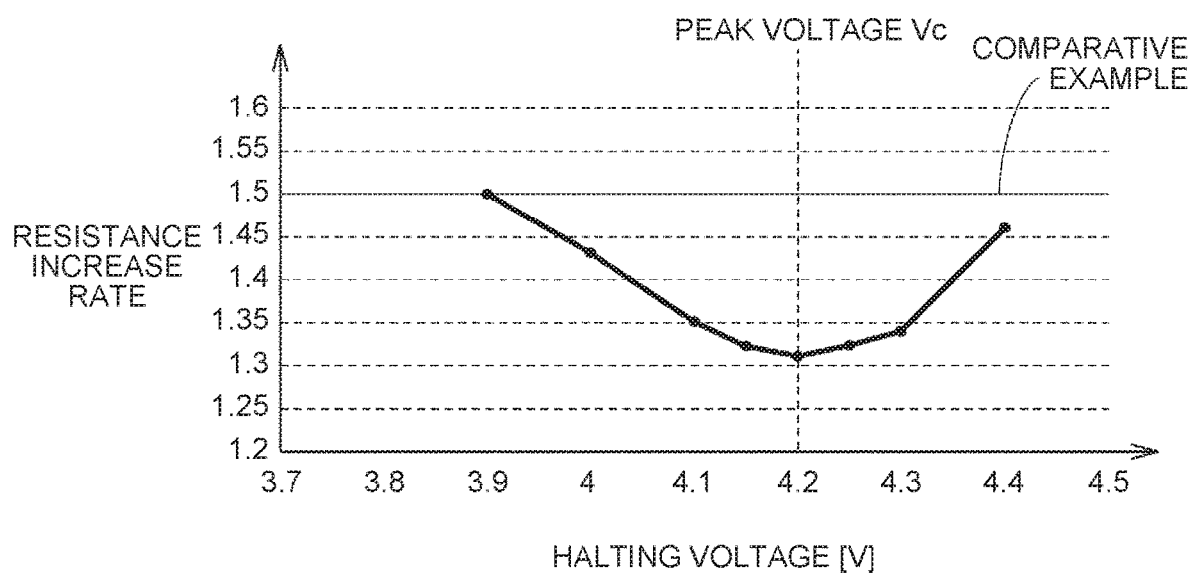
FIG. 13 is a diagram illustrating results of a fourth evaluation test employing the third pattern.

FIG. 12 is a diagram illustrating results of the third evaluation test employing the third pattern (discharge halting pattern). FIG. 13 is a diagram illustrating results of the fourth evaluation test employing the third pattern (discharge halting pattern). In FIGS. 12 and 13, the abscissa indicates a voltage halted during the discharge (halting voltage), and the ordinate indicates the resistance increase rate of the cell 31.

Referring to FIGS. 12 and 13, in both the recovery process of the discharge halting pattern, the discharge of the battery 30 was halted at the peak voltage Vc (Vc=4.1 V in FIG. 12, and Vc=4.2 V in FIG. 13), and this state was continued for a predetermined time period (for 30 minutes in these examples). Thus, as compared with a case where the halting voltage is set to a voltage different from the peak voltage Vc (or the comparative example), the increase of the internal resistance of the cell 31 can be made small.

In this manner, according to the present embodiment, the recovery process of the battery 30 is executed when the deterioration index value ΣD of the battery 30 exceeds the threshold value TH. In this recovery process, the voltage V of the battery 30 (the voltage of each cell 31) is set to the same voltage as the peak voltage Vc, or retained or changed in a narrow range in the vicinity of the peak voltage Vc. Thus, the shrinkage of the positive electrode 37 due to the structural change of the positive electrode active material is actively caused, so as to expand the negative electrode 38. Owing to the expansion of the negative electrode 38, an excessive portion of the electrolyte is absorbed by the negative electrode 38, and the bias in the salt concentration distribution caused in the electrode assembly 36 is reduced. For this recovery process, there is no need to heat or vibrate the battery 30, but the power converter 10 or the PCU 60 originally provided in the vehicle 1 can be used. Accordingly, the performance of the lithium ion battery in which the high rate deterioration has proceeded can be recovered with a simple structure as compared with those described in JP 2014-154399 A and JP 2010-251025 A.

It should be regarded that the embodiment herein disclosed is not restrictive but illustrative in all points. It is intended that the scope of the present disclosure is defined not by the above description of the embodiment but by the appended claims, and encompasses all changes made within equivalent meanings and scope of the appended claims.

What is claimed is:

1. A battery system, comprising:
a lithium ion battery including an electrode assembly;
a voltage converter configured to be capable of changing a voltage of the lithium ion battery; and
a control unit that controls the voltage converter,
wherein the control unit is programmed to calculate an index value corresponding to a degree of progress of deterioration occurring in the lithium ion battery due to bias in a lithium ion concentration distribution within the electrode assembly, and control the voltage converter to cause the voltage of the lithium ion battery to fall within a predetermined voltage range including a specific voltage when the index value exceeds a threshold value,
the specific voltage is a peak voltage on a dQ/dV voltage characteristic curve, the peak voltage being derived from structural change of a positive electrode active material contained in the electrode assembly, and
the dQ/dV voltage characteristic curve is a curve indicating a relationship between dQ/dV that is a ratio of a change dQ of a stored electricity amount of the lithium ion battery to a change dV of the voltage of the lithium ion battery, and the voltage of the lithium ion battery.

2. The battery system according to claim 1, wherein the control unit is programmed to control the voltage converter in such a manner that the lithium ion battery is repeatedly charged/discharged within the voltage range when the index value exceeds the threshold value.

3. The battery system according to claim 1, wherein the control unit is programmed to control the voltage converter in such a manner that a state of the lithium ion battery at a constant voltage within the voltage range is retained for a predetermined time period when the index value exceeds the threshold value.

4. The battery system according to claim 1,
wherein the positive electrode active material contains a lithium nickel composite oxide represented by the following formula (1) and having a layer structure,

  (1)

wherein M includes at least one selected from the group consisting of Co, Mn and Al, and relationships of 0.6 ≤ x ≤ 1, 0 < y and x+y=1 are satisfied.

5. A method for controlling a lithium ion battery including an electrode assembly, comprising:
a step of calculating an index value corresponding to a degree of progress of deterioration of the lithium ion battery due to bias in a lithium ion concentration distribution within the electrode assembly; and
a step of adjusting a voltage of the lithium ion battery to fall within a predetermined voltage range including a specific voltage when the index value exceeds a threshold value,
wherein the specific voltage is a peak voltage on a dQ/dV voltage characteristic curve, the peak voltage being derived from structural change of a positive electrode active material contained in the electrode assembly, and
the dQ/dV voltage characteristic curve is a curve indicating a relationship between dQ/dV that is a ratio of a change dQ of a stored electricity amount of the lithium ion battery to a change dV of the voltage of the lithium ion battery, and the voltage of the lithium ion battery.

* * * * *